US006978256B2

(12) United States Patent
Okayama et al.

(10) Patent No.: US 6,978,256 B2
(45) Date of Patent: Dec. 20, 2005

(54) METHOD AND APPARATUS FOR SELLING DIGITAL CONTENTS, PROCESSING PROGRAM THEREOF AND RECORDING MEDIUM FOR THE PROGRAM

(75) Inventors: Nobuya Okayama, Kawasaki (JP); Masayuki Orimo, Kawasaki (JP); Hiroshi Koike, Maebashi (JP); Hiroya Onimaru, Owariasahi (JP); Seiji Ichihara, Owariasahi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/244,515

(22) Filed: Sep. 17, 2002

(65) Prior Publication Data

US 2003/0014369 A1 Jan. 16, 2003

Related U.S. Application Data

(63) Continuation of application No. 09/473,298, filed on Dec. 28, 1999.

(30) Foreign Application Priority Data

Dec. 28, 1998 (JP) .......................................... 10-373650

(51) Int. Cl.[7] ................................................ G06F 17/60

(52) U.S. Cl. .............................. 705/64; 705/1; 705/16; 705/50; 705/51; 705/52; 705/53; 705/55; 705/56; 705/57; 705/58; 705/64; 705/73; 705/75; 380/200; 380/201; 380/202; 713/159; 713/156; 713/176

(58) Field of Search ................................ 705/50–59, 1, 705/16, 64–79; 380/200–242; 713/150–287

(56) References Cited

U.S. PATENT DOCUMENTS

| | | | | |
|---|---|---|---|---|
| 5,664,110 A | | 9/1997 | Green et al. | 705/26 |
| 5,748,485 A | | 5/1998 | Christiansen et al. | |
| 5,769,269 A | | 6/1998 | Peters | 221/7 |
| 5,860,068 A | | 1/1999 | Cook | 705/26 |
| 5,991,372 A | | 11/1999 | Davenport et al. | 379/91.02 |
| 6,055,314 A | * | 4/2000 | Spies et al. | 380/21 |
| 6,067,416 A | * | 5/2000 | Fraser | 717/178 |
| 6,226,618 B1 | * | 5/2001 | Downs et al. | 705/1 |
| 6,425,081 B1 | * | 7/2002 | Iwamura | 713/176 |
| 6,490,355 B1 | * | 12/2002 | Epstein | 380/203 |

FOREIGN PATENT DOCUMENTS

| | | |
|---|---|---|
| EP | 665486 A2 | 8/1995 |
| EP | 809221 A2 | 11/1997 |
| JP | 59208670 | 11/1984 |
| JP | 05089363 | 4/1993 |
| JP | 6044267 | 2/1994 |
| JP | 8180108 | 7/1996 |
| JP | 9319973 | 12/1997 |
| JP | 1049583 | 2/1998 |

(Continued)

OTHER PUBLICATIONS

Von Faber et al., "The Secure Distribution of Digital Contents", 1997, IEEE, pp. 16–22.*

Dwork et al., "Digital Signets: Self–Enforcing Protection of Digital Information", 1996 ACM, pp. 489–498.*

*Primary Examiner*—James P. Trammell
*Assistant Examiner*—Jalatee Worjloh
(74) *Attorney, Agent, or Firm*—Mattingly, Stanger, Malur & Brundidge, P.C.

(57) ABSTRACT

The present invention relates to a digital contents selling system for selling digital contents. Identification information of digital contents selected by a customer is received. Personal digital contents are generated by setting identification information for identifying the customer in the selected digital contents as status information for permitting the customer to replay the selected digital contents. The generated digital contents are sold. Thereby, a technique is provided for preventing the illegal use of the sold digital contents.

5 Claims, 7 Drawing Sheets

FOREIGN PATENT DOCUMENTS

| | | | | |
|---|---|---|---|---|
| JP | 10049583 | | 2/1998 | |
| JP | 10191036 | | 7/1998 | |
| JP | 10222574 | | 8/1998 | |
| JP | 10-250029 | * | 9/1998 | ............. B41C/1/10 |
| JP | 10254850 | | 9/1998 | |
| JP | 11143719 | | 5/1999 | |
| WO | 9820672 | | 5/1998 | |
| WO | 9858306 | | 12/1998 | |

* cited by examiner

METHOD AND APPARATUS FOR SELLING DIGITAL CONTENTS, PROCESSING PROGRAM THEREOF AND RECORDING MEDIUM FOR THE PROGRAM

CROSS-REFERENCES TO RELATED APPLICATIONS

The present application is a continuation of application Ser. No. 09/473,298, filed Dec. 28, 1998, the contents of which are incorporated herein by reference.

This application is related to application Ser. No. 09/473, 278 filed on Dec. 28, 1999, corresponding to Japanese Patent Application No. 10-372543, filed on Dec. 28, 1998, and the content of which is incorporated herein by reference in its entirety.

This application is related to application Ser. No. 09/473, 275, filed on Dec. 28, 1999, corresponding to Japanese Patent Application No. 10-373649, filed on Dec. 28, 1998, and the content of which is incorporated herein by reference in its entirety.

This application is related to application Ser. No. 09/473, 277, filed on Dec. 28, 1999, corresponding to Japanese Patent Application No. 10-373651, filed on Dec. 28, 1998, and the content of which is incorporated herein by reference in its entirety.

BACKGROUND OF THE INVENTION

The present invention relates to a digital contents vending machine for selling digital contents, or more in particular to a technique effectively applicable to a digital contents vending machine for selling personal digital contents the replay of which is limited to the purchaser.

With the development of the communication through the internet and satellites, a system has been developed to distribute and sell digital contents. This trend indicates that the computer and the network are required as an infrastructure for wide extension of the digital contents throughout the society. In the distribution and sales of the digital contents, the digital contents are required to be distributed or sent to a sales point in the vicinity of the general users, and to be sold from a vending machine.

The conventional digital contents vending machine is installed in convenience stores, for example. Such a vending machine has the function of searching for a commodity, outputting the order receipt for the ordered commodity, reserving for a commodity, copying from a CDROM to a medium, etc., whereby the digital contents selected by the customer are copied from the CD-ROM to other medium which is sold.

For preventing the illegal use of the digital contents, the function is required to limit and permit the use of the digital contents to the individuals who have legitimately purchased the particular digital contents. However, the conventional digital contents vending machine cannot sell the digital contents as a commodity permitted to be used only by a person. Therefore, the problem is that the illegal use of the sold digital contents cannot be prevented.

The conventional digital contents vending machine also lacks the function of preventing the illegal use of the original digital contents from which copies are produced. As a result, the illegal use in which the original digital contents stored in the CD-ROM or the vending machine are illegally copied or downloaded or a medium for storing the original digital contents is brought away, cannot be prevented.

SUMMARY OF THE INVENTION

The object of the present invention is to solve these problems and to provide a technique capable of preventing the illegal use of the sold digital contents.

According to the present invention, there is provided a digital contents vending machine for selling personal digital contents of which the qualification for replay is limited to a purchaser.

In the digital contents vending machine according to the present invention, commodity information of digital contents meeting a retrieval condition input by a customer is displayed, and identification information of the digital contents selected by the customer is received.

A payment confirmation processing unit of a digital contents vending machine displays a GUI (graphical user interface) for payment confirmation on a display unit, and waits for a payment confirmation operation from a sales staff. When an operation indicating a payment confirmation completion such as push of a payment confirmation button is performed, it is determined that payment of a charge for the digital contents selected by the customer is completed. As an alternative, it can be determined that the payment of the charge for the digital contents selected by the customer is completed upon receipt of payment confirmation information transmitted from a POS (point of sales) system after the charge for the digital contents is paid in the POS system.

A sales processing unit of the digital contents vending machine sets a personal identification (personal ID) for identifying the customer as status information for permitting the particular customer to replay the digital contents for which the payment of the charge is confirmed in the manner described above and thereby generates the personal digital contents. This personal digital contents are copied to a medium or downloaded to a replay unit to thereby sell the digital contents selected by the customer.

As described above, according to the present invention, the digital contents are sold after inputting the personal ID of the customer who has purchased the digital contents to generate the personal digital contents. Therefore, the particular digital contents cannot be used by other than the particular customer. As a result, even if the sales staff or other customers illegally acquire the particular digital contents, they cannot be viewed or heard the particular digital contents. Thus, the illegal use of the digital contents can be prevented.

Also, according to the present invention, the digital contents cannot be copied or downloaded before the payment confirmation of the charge, so that the illegal duplication or downloading of the digital contents can be prevented. Further, according to the present invention, the information on the sales staff who confirms the payment is recorded, so that when the sales staff who illegally confirms the payment by operating the vending machine, he can be easily identified.

Further, according to the present invention, the vending machine or a distribution control center monitors the state of the vending machine. An attempt to open the cover of the vending machine and bring away the digital contents stored therein causes the sales processing to be stopped or the digital contents to be deleted, so that it is possible to prevent the illegal removal of the digital contents.

As described above, in the digital contents vending machine according to the present invention, the personal digital contents the replay qualification of which is limited to the particular purchaser are sold, so that it is possible to prevent the illegal use of the sold digital contents.

DESCRIPTION OF THE PREFERRED EMBODIMENTS

An object of the present invention is to solve the problems mentioned above and to provide a technique for preventing the illegal use of the sold digital contents.

Another object of the present invention is to provide a technique capable of preventing the illegal use of the digital contents stored in the vending machine.

Embodiments for achieving the aforementioned objects are described below.

First, an explanation will be given of a digital contents vending machine installed in outlets such as bookstores and convenience stores for selling electronic books constituting digital contents.

Figure 1:
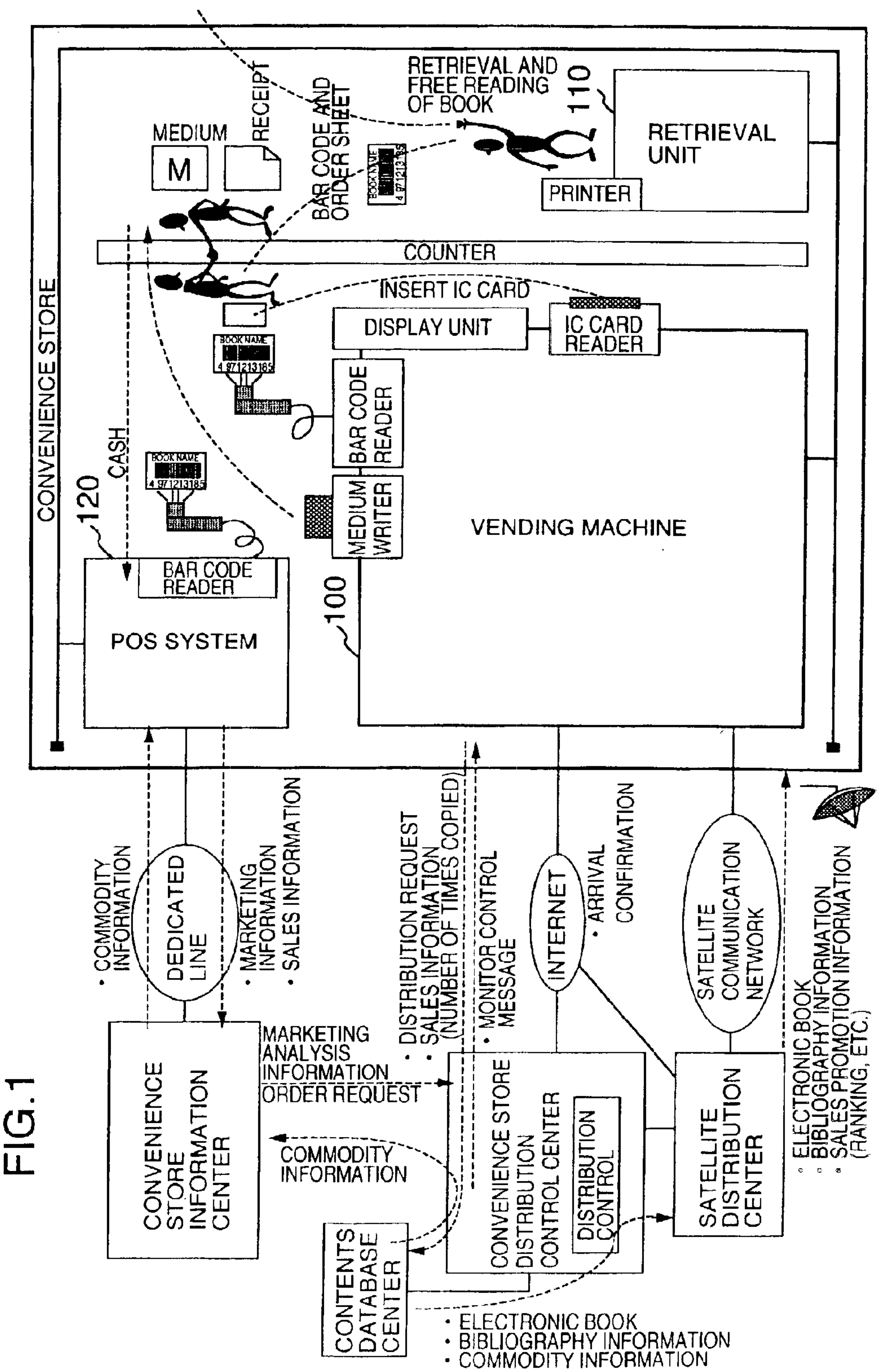
FIG. 1 is a diagram showing a general configuration of a digital contents vending system according to an embodiment of the present invention.

FIG. 1 is a diagram showing a general configuration of a digital contents vending system according to the embodiment. As shown in FIG. 1, the digital contents vending system according to the embodiment comprises a vending machine 100, a retrieval unit 110 and a POS system 120.

The vending machine 100 reads an order sheet output from the retrieval unit 110, copies an electronic book selected by a customer to a medium and sells the medium to the customer. The retrieval unit 110 searches and displays commodity information on electronic books stored in the vending machine 100 and outputs the order sheet for the electronic book selected by the customer. The POS system 120 reads the order sheet output from the retrieval unit 110 and settles payment of a charge for the electronic book selected by the customer.

In the digital contents vending system according to the embodiment shown in FIG. 1, first, the retrieval unit 110 displays a GUI for retrieving the electronic book and waits for an operating instruction from the customer. Upon entry of the operating instruction from the customer, the commodity information on the electronic books stored in the vending machine 100 are searched and displayed, and the order sheet for the electronic book selected by the customer is output. The customer delivers the order sheet to the sales staff of the store. The sales staff causes the order sheet output from the retrieval unit 110 to be read by the POS system 120, and thus settles the payment of the charge for the electronic book selected by the customer.

After the authentication of the sales staff for the vending machine 100 by the sales staff, the order sheet output from the retrieval unit 110, the information indicating the complete payment of the charge and the personal ID for identifying the customer are input to the vending machine 100. Then, the vending machine 100 converts the electronic book selected by the customer into a personal electronic book for the particular customer and copies it to a medium. The sales staff then delivers the medium to the customer.

Figure 2:
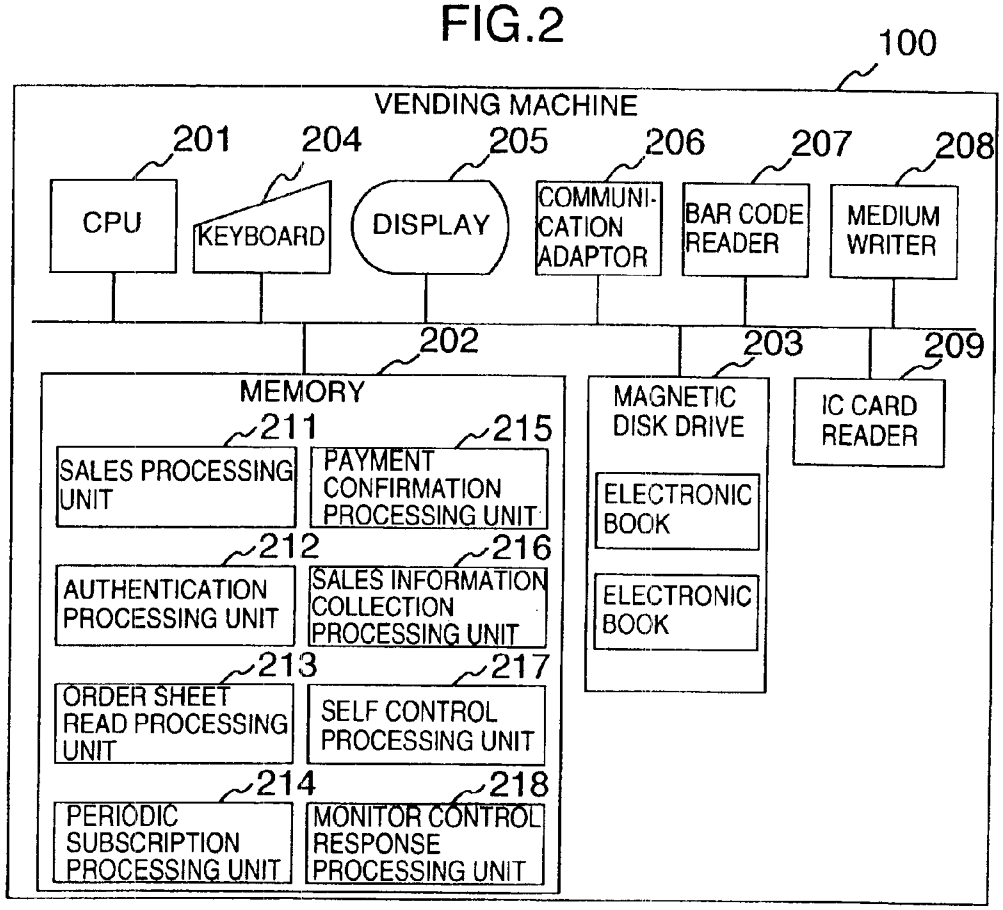
FIG. 2 is a diagram showing a general configuration of a vending machine 100 according to the embodiment.

FIG. 2 is a diagram showing a general configuration of the vending machine 100 according the embodiment. As shown in FIG. 2, the vending machine 100 according to the embodiment comprises a CPU 201, a memory 202, a magnetic disk drive 203, a keyboard 204, a display unit 205, a communication adaptor 206, a bar code reader 207, a medium writer 208 and an IC card reader 209.

The CPU 201 is a control unit for controlling the whole operation of the vending machine 100. The memory 202 is a storage unit for loading various processing programs and data for controlling the operation of the vending machine 100. The magnetic disk drive 203 is a storage unit for storing the various processing programs and data such as electronic books.

The keyboard 204 is an input device for inputting operating instructions and so forth into the vending machine 100. The display unit 205 is an output unit for displaying operating conditions and so forth of the vending machine 100. The communication adaptor 206 is an adaptor for communicating with other devices.

The bar code reader 207 is a device for reading a bar code printed on the order sheet. The medium writer 208 is a device for writing the sold electronic book into the medium. The IC card reader 209 is a device for reading an IC card for authenticating the sales staff.

The vending machine 100 further comprises a sales processing unit 211, an authentication processing unit 212, an order sheet read processing unit 213, a periodic subscription processing unit 214, a payment confirmation processing unit 215, a sales information collection processing unit 216, a self control processing unit 217 and a monitor control response processing unit 218.

The sales processing unit 211 sets a customer ID for identifying the customer as the status information for permitting the particular customer alone to replay the electronic book selected by the customer, generates the personal electronic book and sells the generated personal electronic book.

The authentication processing unit 212 is a processing unit for authenticating the sales staff who confirms the payment of the charge for the electronic book. The order sheet read processing unit 213 is a processing unit for reading the order sheet. The periodic subscription processing unit 214 is a processing unit for adding the electronic book, which is subscribed but not purchased by the customer, as an object to be purchased.

The payment confirmation processing unit 215 is a processing unit for inputting the payment confirmation from the sales staff or the POS system 120 and confirming that the payment of the charge for the electronic book selected by the customer is completed. The sales information collection processing unit 216 is a processing unit for storing sales information which indicates the contents of the sales made by the vending machine 100 and includes the sales staff ID for identifying the sales staff who confirms the payment of the charge for the electronic book.

The self control processing unit 217 is a processing unit for monitoring the state of the vending machine 100 itself and stopping the sales processing or deleting the electronic book stored in the magnetic disk drive 203 upon detection of an error state. The monitor control response processing unit 218 is a processing unit for performing the transmission of the operating conditions, the stop of the sales processing or the deletion of the electronic book stored in the magnetic disk drive 203 according to the instruction from the distribution control center.

The program for enabling the vending machine 100 to perform the functions of the sales processing unit 211, the authentication processing unit 212, the order sheet read processing unit 213, the periodic subscription processing unit 214, the payment confirmation processing unit 215, the sales information collection processing unit 216, the self control processing unit 217 and the monitor control response processing unit 218 is recorded in the recording medium such as the CD-ROM and stored in the magnetic disk and so forth, and then loaded in a memory for execution. The medium for recording the program may be other than the CD-ROM.

Figure 3:
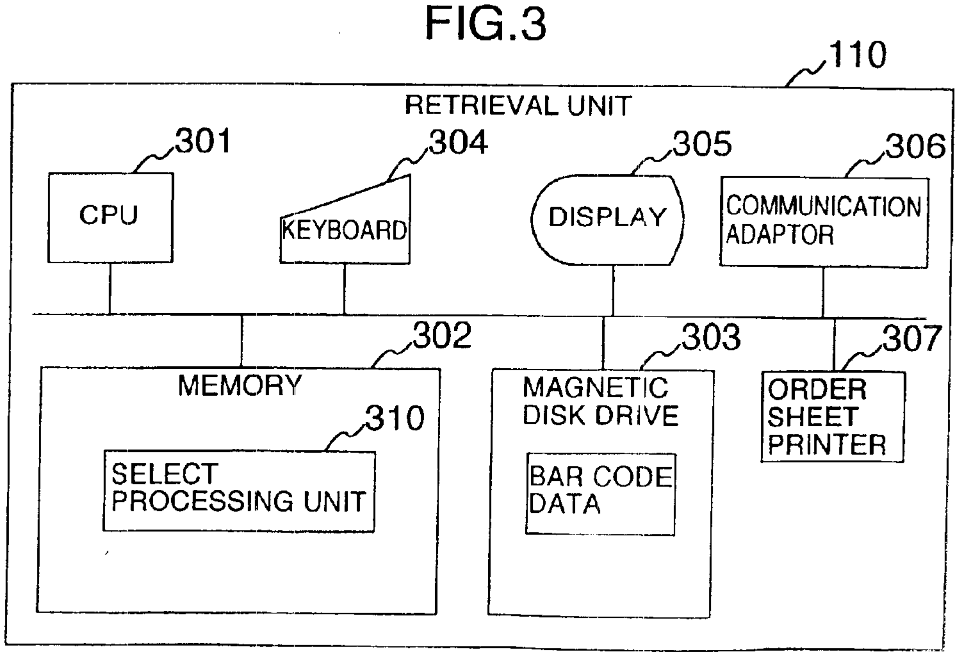
FIG. 3 is a diagram showing a general configuration of a retrieval unit 110 according to the embodiment.

FIG. 3 is a diagram showing a general configuration of the retrieval unit 110 according to the embodiment.

As shown in FIG. 3, the retrieval unit 110 according to the embodiment includes a CPU 301, a memory 302, a magnetic disk drive 303, a keyboard 304, a display unit 305, a communication adaptor 306 and an order sheet printer 307.

The CPU 301 is a control unit for controlling the whole operation of the retrieval unit 110. The memory 302 is a storage unit for loading various processing programs and data for controlling the operation of the retrieval unit 110. The magnetic disk drive 303 is a storage unit for storing the various processing programs and data such as the commodity information of the electronic books.

The keyboard 304 is an input device for inputting operating instructions and so forth to the retrieval unit 110. The display unit 305 is an output device for displaying a GUI for retrieval processing, the operating conditions of the retrieval unit 110 and so forth. The communication adaptor 306 is an adaptor for communicating with other devices. The order sheet printer 307 is a device for printing the bar code for identifying the selected electronic book on the order sheet and outputting the order sheet.

The retrieval unit 110 further includes a select processing unit 310. The select processing unit 310 is a processing unit for displaying the commodity information of the electronic book which meets the retrieval conditions input by the customer, and printing and outputting the order sheet printed with the commodity ID for identifying the electronic book selected by the customer with the bar code shared by the POS system 120.

The program required for enabling the retrieval unit 110 to function as the select processing unit 310 is recorded in a recording medium such as a CD-ROM and stored in a magnetic disk or the like, after which it is loaded in a memory for execution. The medium for recording the program may be other than the CD-ROM.

An explanation will be given below of the process for selling the electronic book selected by the customer through the digital contents vending system according to the embodiment.

Figure 4:
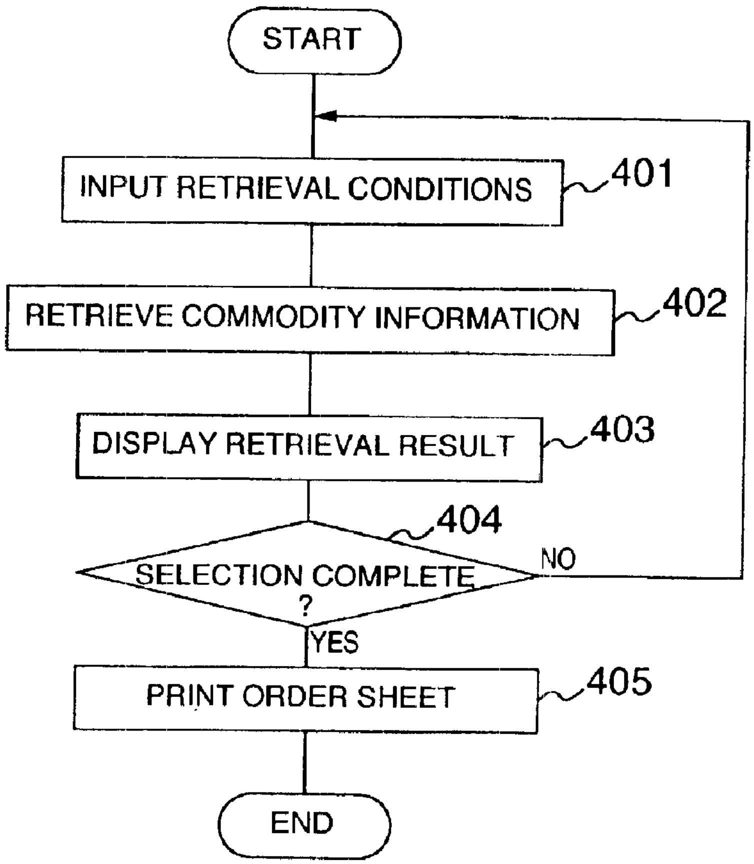
FIG. 4 is a flowchart showing the processing steps of a select processing unit 310 according to the embodiment.

FIG. 4 is a flowchart showing the processing steps for the select processing unit 310 according to the embodiment. In step 401, the select processing unit 310 of the retrieval unit 110 displays the GUI for retrieving the electronic book on the display unit 305 and receives the retrieval conditions input by the customer. Upon receipt of the retrieval conditions from the customer, the select processing unit 310 searches the commodity information in the vending machine 100 and reads the commodity information of the electronic book meeting the received retrieval conditions in step 402. In step 403, the commodity information of the electronic book obtained as the result of retrieval is displayed on the display unit 305 and the selection of the electronic book by the customer is accepted.

In step 404, it is checked whether a specific electronic book contained in the displayed commodity information is the one selected by the customer or not, and in the case where the particular electronic book is the one selected by the customer, the process proceeds to step 405. In the case where a repeated retrieval is indicated, the process returns to step 401 for accepting the input of the retrieval conditions again.

In step 405, the bar code for identifying the selected electronic book is printed by the order sheet printer 307, and the order sheet printed with the bar code is delivered out of the printer. The customer delivers the output order sheet to the sales staff of the store and requests the purchase of the electronic book. The bar code for identifying the selected electronic book is shared by the bar code used for the POS system 120.

Upon delivery of the order sheet from the customer to the sales staff of the store, the sales staff causes the POS system 120 to read the order sheet output from the retrieval unit 110, receives from the customer the charge for the electronic book selected by the customer, and thus settles the payment of the charge for the particular electronic book.

Figure 5:
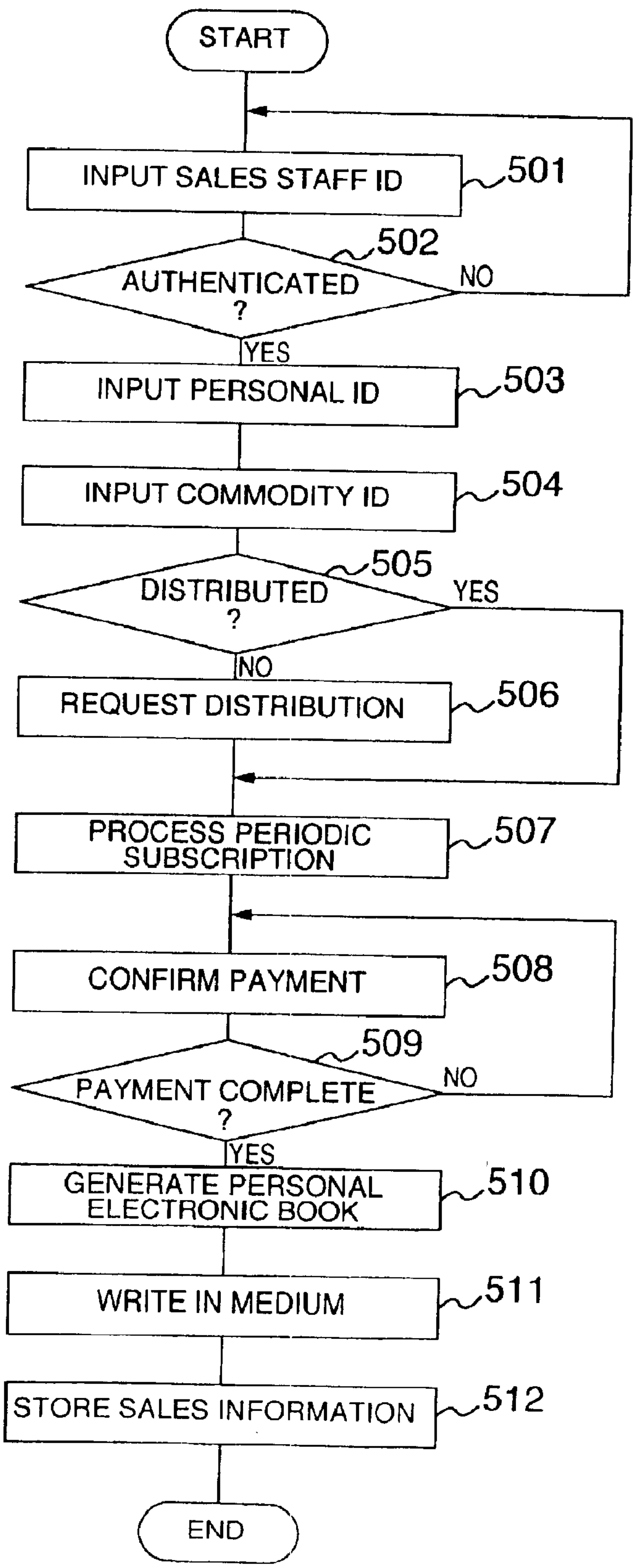
FIG. 5 is a flowchart showing the processing steps of a sales processing unit 211 according to the embodiment.

FIG. 5 is a flowchart showing the processing steps of the sales processing unit 211 according to the embodiment. In step 501, the sales processing unit 211 of the vending machine 100 activates the authentication processing unit 212 upon detection of the IC card held by the sales staff by means of the IC card reader 209. The authentication processing unit 212 reads the IC card held by the sales staff using the IC card reader 209, and then compares the ID of the sales staff in the IC card with the IDs of the sales staffs pre-registered in the vending machine 100 in step 502. In the case where the ID of the sales staff in the IC card coincides with one of the IDs of the sales staffs in the vending machine 100, the process proceeds to step 503. On the other hand, in the case where the ID of the sales staff fails to coincide with any one of them, the process returns to step 501 and waits for the reentry of the ID of the sales staff.

In step 503, the sales processing unit 211 inputs the personal ID for identifying the customer purchasing the electronic book from the IC card storing the particular personal ID or a card printed with the personal ID as a bar code. The input personal ID includes a device serial number of the replay device of the customer, an ID predetermined by the bookstore for designating the distributor, an ID predetermined by the store for designating a user, a public key, a password of ticket type and so forth.

In step 504, the order sheet read processing unit 213 reads the bar code of the order sheet delivered from the customer using the bar code reader 207 of the vending machine 100, and inputs the commodity ID of the electronic book selected by the customer to the vending machine 100.

In step 505, the sales processing unit 211 checks whether the electronic book specified by the input commodity ID is stored in the magnetic disk drive 203 of the vending machine 100. In the case where the electronic book is not stored in the vending machine 100, the process proceeds to step 506 and a distribution request is transmitted to the distribution control center so that the electronic book is distributed on demand. On the other hand, in the case where the checking in step 505 shows that the electronic book is stored in the vending machine 100, the process proceeds to step 507.

In step 507, the periodic subscription processing unit 214 checks whether the electronic book periodically subscribed by the customer has already been sold or not. It displays the electronic books subscribed but not purchased by the customer as a list of unpurchased books, and adds the commodity ID of the electronic book for which the purchase instruction is input as a book to be purchased.

In step 508, the payment confirmation processing unit 215 displays the GUI for payment confirmation on the display unit 205, and accepts the payment confirmation from the sales staff in step 509. When the operation is performed indicating the complete payment confirmation such as the push of the payment confirmation button and so forth, the process proceeds to step 510. On the other hand, in the case where the payment confirmation is not input, the process returns to step 508 and waits for the input.

By connecting the vending unit 100 to the POS system 120 via a network, the payment confirmation information for the electronic book may be transmitted from the POS system 120 to the vending machine 100 when the payment of the charge for the electronic book is settled.

In step 510, the sales processing unit 211 reads from the magnetic disk drive 203 the electronic book selected by the customer to produces a copy of the electronic book. Then, the sales processing unit 211 stores the personal ID of the customer and the payment confirmation information in the produced copy as the status information permitting the replay by the customer to prepare the personal electronic book. In the case of a trial edition, a time limit is set. On the other hand, in the case where mere validation is sufficient, a simple bit information such as "1" can be set in the status information.

Figure 6:
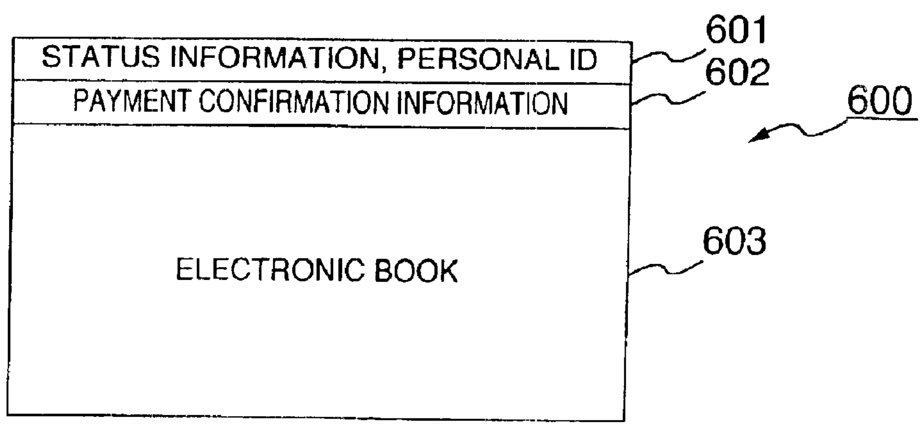
FIG. 6 is a diagram showing an example of the personal electronic book according to the embodiment.

FIG. 6 is a diagram showing an example of the personal electronic book according to the embodiment. As shown in FIG. 6, the personal electronic book 600 according to the embodiment includes status information 601, payment confirmation information 602 and an electronic book 603.

The status information 601 is information for permitting only the particular customer to replay the personal electronic book 600. The payment confirmation information 602 is information for indicating that the payment of the charge for the personal electronic book 600 is completed. The electronic book 603 is the digital Contents itself of the personal electronic book 600. As shown in FIG. 6, the status information 601 of the personal electronic book 600 is set as "0" as the information for permitting only the customer specified by the personal ID to replay the particular electronic book. The electronic book 603 is generated in the format defined by the application program for reproducing the personal electronic book 600 and is assumed to be in the form of an application container described in an intermediate language or in binary mode.

In step 511, the generated personal electronic book is written in a medium such as a flash memory by means of the medium writer 208, and the sales staff delivers to the customer the medium in which the personal electronic book is written. The customer can display and read the electronic book written in the medium on the replay unit owned by the customer. In the process, the replay unit is assumed to perform the replay operation on condition that the personal ID stored in the personal electronic book coincides with the personal ID registered in the replay unit and the payment confirmation information is stored in the personal electronic book.

In step 512, the sales information collection processing unit 216 stores the commodity ID of the sold electronic book, the ID of the sales staff in charge, the personal ID of the purchaser-customer, the type of payment confirmation and the date of sales in the magnetic disk drive 203 as the sales information indicating the contents of the sales processing described above. According to the embodiment, the bar code reader 207 or the IC card reader 209 is used as a device for inputting the commodity ID, the sales staff ID and the personal ID. However, these IDs can alternatively be input by a common device.

In step 507, the periodic subscription processing unit 214 of the sales processing unit 211 performs the periodic subscription process in which the electronic book subscribed but not purchased by the customer is added as an object of purchase. The processing of the periodic subscription processing unit 214 will be explained below.

Figure 7:
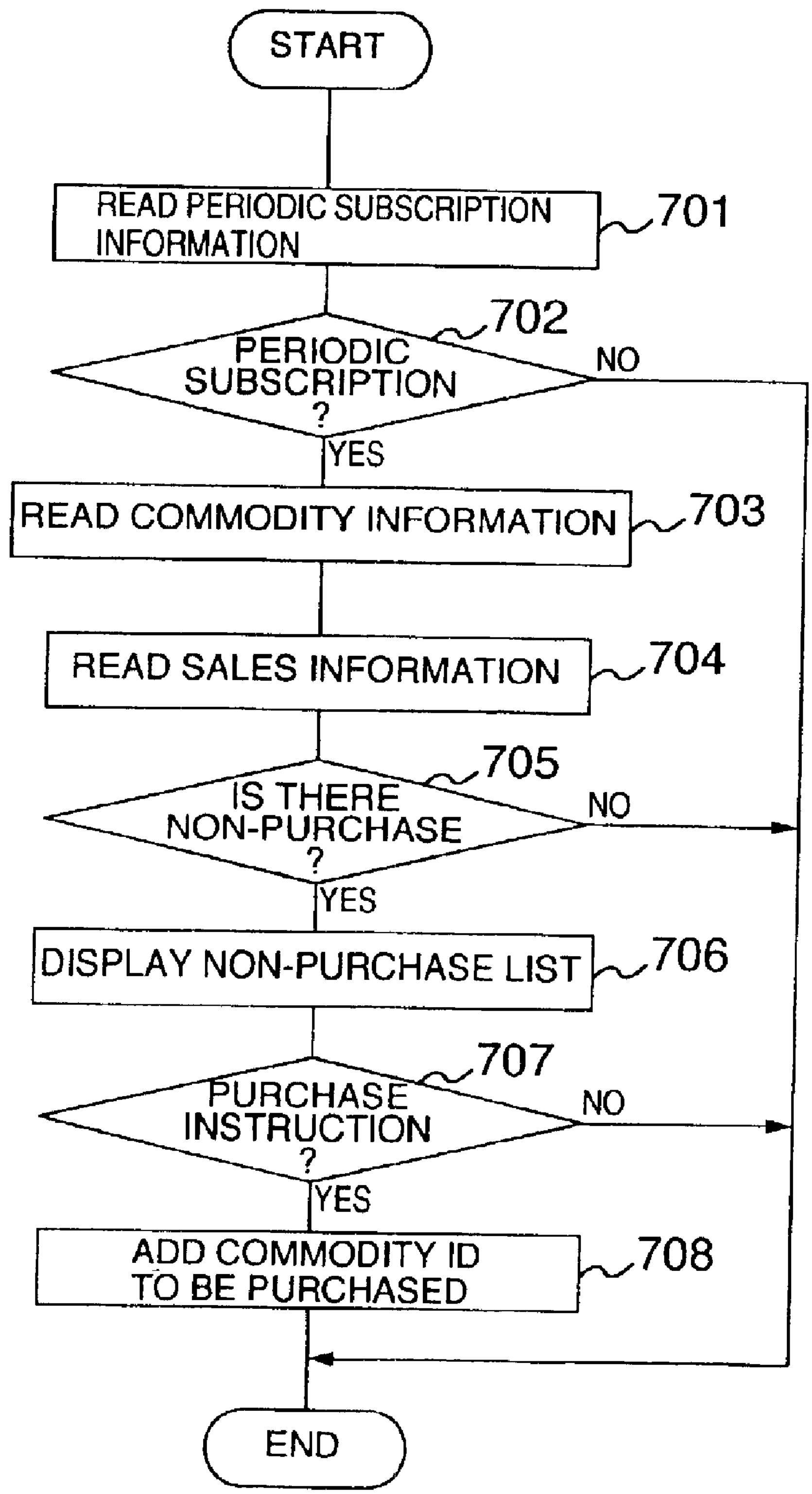
FIG. 7 is a flowchart showing the processing steps of a periodic subscription processing unit 214 according to the embodiment.

FIG. 7 is a flowchart showing the processing steps of the periodic subscription processing unit 214 according to the embodiment. In step 701, the periodic subscription processing unit 214 reads the periodic subscription information from the magnetic disk drive 203. In step 702, it is checked whether the periodic subscription information corresponding to the personal ID of the customer is available or not. In the case where such information is available, the process proceeds to step 703. On the other hand, in the case where such information is not available, the process is terminated and returns to the sales processing unit 211.

In step 703, the commodity information already distributed on the electronic book that is periodically subscribed by the customer is read with reference to the commodity information of the magnetic disk drive 203. In step 704, the commodity information on the electronic books which are periodically subscribed by the customer and are sold to the customer is read with reference to the sales information of the magnetic disk drive 203.

In step 705, the electronic book already distributed is compared with the commodity information on the electronic books already sold to check whether there is any electronic book periodically subscribed and not purchased by the customer. In the case where there is any electronic book not purchased by the customer, the process proceeds to step 706. On the other hand, in the case where there is no electronic book not purchased, the process is terminated and returns to the sales processing unit 211.

In step 706, the electronic books periodically subscribed but not purchased by the customer are displayed as a non-purchase list, and an input as to whether the unpurchased book is purchased or not is accepted. The sales staff asks the customer whether he or she has the intention to purchase with reference to the non-purchase list and inputs the result.

In step 707, it is checked whether an instruction to purchase any electronic book in the non-purchase list is input or not. In the case where the purchase instruction is input, the process proceeds to step 708. Then, the commodity ID of the electronic book for which the purchase instruction is input is added as an object of purchase, and the process returns to the sales processing unit 211. In the case where an instruction not to purchase is input in step 707, the process is terminated and returns to the sales processing unit 211.

Figure 8:
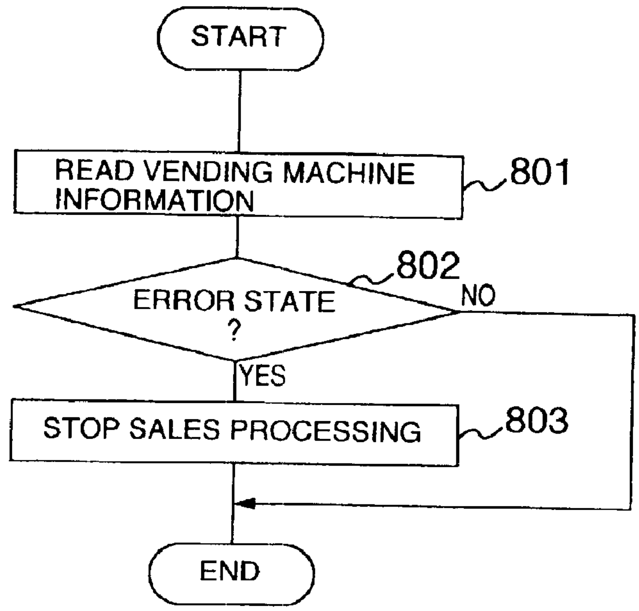
FIG. 8 is a flowchart showing the processing steps of a self control processing unit 217 according to the embodiment.

An explanation will be given below of the processing for stopping the sales processing in accordance with the state of the vending machine 100 in the digital contents vending system according to the embodiment. FIG. 8 is a flowchart showing the processing steps of the self control processing unit 217 according to the embodiment. The self control processing unit 217 of the vending machine 100 starts the processing upon the arrival of a specific time or upon detection of a special event such as the opening of the cover of the vending machine 100 or the illegal reading of the sales staff ID in the authentication processing unit 212. First, in step 801, the vending machine information indicating the state of the vending machine 100 is read from the memory 202 or the magnetic disk drive 203.

In step 802, the contents of the vending machine information is checked. When no error state is detected, the process is terminated. On the other hand, in the case where the error state is detected such as the opening of the cover or the illegal use of the sales staff ID, the process proceeds to step 803 and the processing of the sales processing unit 211 is terminated. In step 803, the electronic book stored in the magnetic disk drive 203 can be deleted to prevent the illegal use of the electronic book.

In the digital contents vending system according to the embodiment, the distribution control center monitors the state of the vending machine 100. In the case where there is no response from the vending machine 100, an error is assumed to have occurred in the vending machine 100 and the sales processing of the particular vending machine 100 can be stopped at the next monitor control.

Figure 9:
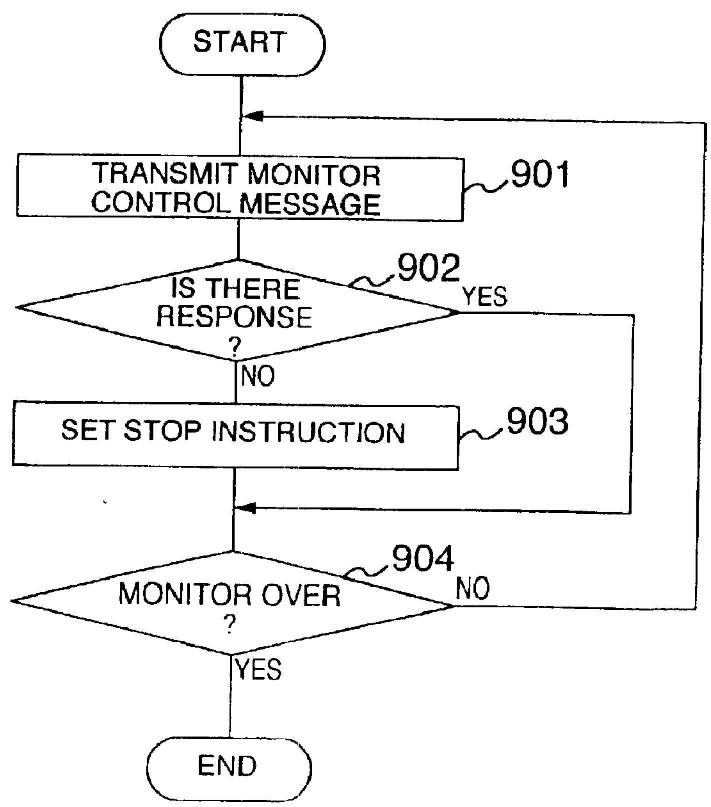
FIG. 9 is a flowchart showing the processing steps of a monitor control processing of a distribution control center according to the embodiment.

FIG. 9 is a flowchart showing the processing steps of the monitor control processing by the distribution control center according to the embodiment. In step 901, the distribution control center starts the operation upon detection of the specific event such as the arrival of the specific time, transmits the monitor control message to the vending machine 100 and waits for a response from the vending machine 100.

Figure 10:
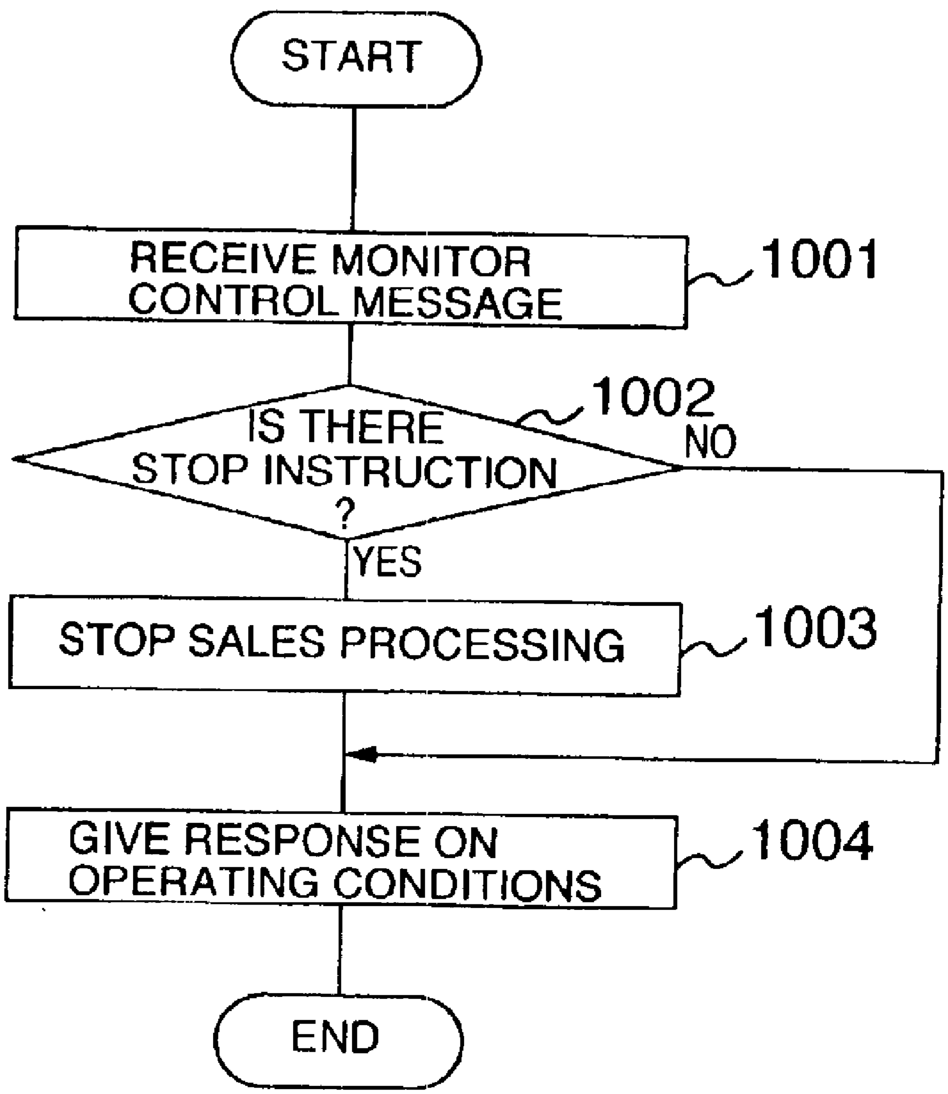
FIG. 10 is a flowchart showing the processing steps of a monitor control response processing unit 218 of the vending machine 100 according to the embodiment.

FIG. 10 is a flowchart showing the processing steps of the monitor control response processing unit 218 of the vending machine 100 according to the embodiment. In step 1001, the monitor control response processing unit 218 of the vending machine 100 receives the monitor control message transmitted from the distribution control center, reads the monitor control message in step 1002, and checks whether an instruction is given to stop the sales processing of the vending machine 100 in the monitor control message. In the case where there is no stop instruction for the sales processing in the monitor control message, the process proceeds to step 1004. In this step, a message indicating the operating conditions of the vending machine 100 is transmitted to the distribution control center as a response to the monitor control message.

In step 902, the distribution control center checks whether the response is received from the vending machine 100 or not. In the case where no response is received, the process proceeds to step 903. In this step, it is assumed that an error is occurred in the vending machine 100, and an instruction to stop the sales processing is set in the monitor control message which is next transmitted to the vending machine 100. On the other hand, in the case where the response is received in step 902, the process proceeds to step 904. In this step, it is checked whether the monitor control message is transmitted to each vending machine controlled by the distribution control center. In the case where the monitor control message is not transmitted to each vending machine, the process returns to step 901. On the other hand, in the case where the transmission of the monitor control message to each vending machine is completed, the monitor control processing is terminated.

In the case where the specific event is detected again in step 901, the monitor control message with the sales processing stop instruction set therein is transmitted to the vending machine from which the response was not received previously.

The monitor control response processing unit 218 of the vending machine 100 which could not transmit the response receives the monitor control message in step 1001. Then, it detects in step 1002 that the instruction to stop the sales processing in the monitor control message to stop the sales processing of the vending machine 100 in step 1003. At the same time, the electronic book stored in the magnetic disk drive 203 can be deleted to prevent the illegal use of the electronic book.

In step 1004, a message indicating that the sales processing of the vending machine 100 is stopped is transmitted to the distribution control center as a response to the monitor control message.

As described above, in the digital contents vending machine according to the present invention, the personal digital contents limiting the qualification for replay to the purchaser is sold. Therefore, the illegal use of the sold digital contents is prevented.

Also, in the digital contents vending machine according to the present invention, the digital contents are sold after confirming the payment of the charge for the digital contents selected by the customer. Therefore, it is possible to prevent the illegal use of the digital contents stored in the vending machine.

Further, in the digital contents vending machine according to the present invention, the vending machine itself and the distribution control center detect the error state of the vending machine to stop the sales processing or to delete the digital contents. Therefore, the illegal removal of the digital contents stored in the vending machine is prevented.

According to the present invention, the personal digital contents limiting the qualification for replay to the purchaser are sold. Therefore, it is possible to prevent the illegal use of the sold digital contents.

What is claimed:

1. A computer implemented method of selling digital contents, comprising the steps performed by a computer of:

receiving as an input to said computer identification information of digital contents selected by a customer;

confirming that a payment of a charge for said digital contents selected by the customer is completed;

generating digital contents by setting identification information for identifying said customer and information for indicating a complete payment confirmation of the charge for said selected digital contents in said selected digital contents as status information for permitting said customer to replay said selected digital contents;

selling said generated digital contents as an output from said computer to said customer, wherein said identification information of said digital contents, identification information of said customer and identification information of a sales staff are read by a device for selling said generated digital contents, authenticating a sales staff who confirms the payment of the charge for said selected digital contents; and recording identification information of said sales staff who confirms the payment of the charge for said selected digital contents, wherein in said confirming step, a payment confirmation from said sales staff is input, and wherein said recording of identification information of said sales staff is used to prevent unauthorized processing of said digital contents by said sales staff.

2. A computer implemented method according to claim 1, wherein said identification information of said digital contents, said identification information of said customer and said identification information of said sales staff are read by a same device.

3. An apparatus for selling digital contents, comprising:

a select processing unit for receiving identification information of digital contents selected by a customer; and a sales processing unit for confirming that a payment of a charge for said selected digital contents is completed, setting identification information for identifying said customer and information for indicating a complete payment confirmation of the charge for said selected digital contents in said selected digital contents as status information for permitting only said customer to replay said selected digital contents to generate digital contents, selling said generated digital contents, authenticating a sales staff who confirms the payment of the charge for said selected digital contents, and recording identification information of said sales staff who confirms the payment of the charge for said selected digital contents, wherein in said confirming, a payment confirmation from said sales staff is input, wherein said recording of identification information of said sales staff is used to prevent unauthorized processing of said digital contents by said sales staff, and wherein said identification information of said digital contents, identification information of said customer and identification information of a sales staff are read by a device for selling said generated digital contents.

4. A medium for recording a program for causing a computer when executed to function as a digital contents vending machine for selling digital contents, said medium comprising:

a program code for causing said computer to function as a select processing unit for receiving identification information of digital contents selected by a customer and as a sales processing unit for confirming that a payment of a charge for said selected digital contents is completed, for setting identification information for identifying said customer and information for indicating a complete payment confirmation of the charge for said selected digital contents in said selected digital contents as status information for permitting only said customer to replay said selected digital contents to generate digital contents, for selling said generated digital contents, for authenticating a sales staff who confirms the payment of the charge for said selected digital contents, and for recording identification information of said sales staff who confirms the payment of the charge for said selected digital contents, wherein in said confirming, a payment confirmation from said sales staff is input, wherein said recording of identification information of said sales staff is used to prevent unauthorized processing of said digital contents by said sales staff, and wherein said identification information of said digital contents, identification information of said customer and identification information of a sales staff are read by a device for selling said generated digital contents.

5. A computer readable storage medium having stored thereon program for selling digital contents, said program when executed causes a computer to perform the steps of:

receiving as an input to said computer identification information of digital contents selected by a customer;

confirming that a payment of a charge for said digital contents selected by the customer is completed;

generating digital contents by setting identification information for identifying said customer and information for indicating a complete payment confirmation of the charge for said selected digital contents in said selected digital contents as status information for permitting said customer to replay said selected digital contents;

selling said generated digital contents as an output from said computer to said customer;

authenticating a sales staff who confirms the payment of the charge for said selected digital contents; and recording identification information of said sales staff who confirms the payment of the charge for said selected digital contents, wherein in said confirming step, a payment confirmation from said sales staff is input, wherein said recording of identification information of said sales staff is used to prevent unauthorized processing of said digital contents by said sales staff, and wherein said identification information of said digital contents, identification information of said customer and identification information of a sales staff are read by a device for selling said generated digital contents.

* * * * *